(12) United States Patent
Kang et al.

(10) Patent No.: US 8,915,731 B2
(45) Date of Patent: Dec. 23, 2014

(54) FLAMELESS COMBUSTION BURNER

(75) Inventors: Taekyu Kang, Wilmington, DE (US);
Vivek Gautam, Bear, DE (US); Rajeev S. Prabhakar, Wilmington, DE (US);
Benoit Grand, Versailles (FR);
Bertrand Leroux, Linas (FR); Magnus Mortberg, Frankfurt am Main (DE);
Nicolas Docquier, Philadelphia, PA (US)

(73) Assignees: L'Air Liquide Societe Anonyme pour l'Etude et l'Exploitation des Procedes Georges Claude, Paris (FR); American Air Liquide, Inc., Fremont, CA (US);
Air Liquide Advanced Technologies, U.S. LLC, Houston, TX (US)

( * ) Notice: Subject to any disclaimer, the term of this patent is extended or adjusted under 35 U.S.C. 154(b) by 0 days.

(21) Appl. No.: 12/982,818

(22) Filed: Dec. 30, 2010

(65) Prior Publication Data
US 2012/0171629 A1 Jul. 5, 2012

(51) Int. Cl.
*F23C 5/00* (2006.01)
*F23C 99/00* (2006.01)
*F23L 7/00* (2006.01)
*F23M 5/02* (2006.01)
*F23C 9/00* (2006.01)

(52) U.S. Cl.
CPC ............... *F23L 7/007* (2013.01); *Y02E 20/342* (2013.01); *F23C 99/00* (2013.01); *Y02E 20/344* (2013.01); *F23M 5/025* (2013.01); *F23C 2900/99001* (2013.01); *F23C 9/006* (2013.01)
USPC ............... 431/8; 431/174; 431/354; 110/205; 110/297

(58) Field of Classification Search
USPC ............ 431/8, 9, 10, 12, 181, 182, 187, 284; 110/297
See application file for complete search history.

(56) References Cited

U.S. PATENT DOCUMENTS

| 5,570,679 A | 11/1996 | Wunning |
| 5,636,977 A | 6/1997 | Benson et al. |
| 5,688,115 A | 11/1997 | Johnson |
| 5,772,421 A | 6/1998 | Besik et al. |
| 5,961,312 A | 10/1999 | Sugiyama et al. |

(Continued)

FOREIGN PATENT DOCUMENTS

| EP | 0 687 853 A2 | 12/1995 |
| EP | 1 205 710 | 5/2002 |

(Continued)

OTHER PUBLICATIONS

Cavaliere, et al., "Mild Combustion," Progress in Energy and Combustion Science, vol. 30, pp. 329-366, 2004.

(Continued)

*Primary Examiner* — Alfred Basichas
(74) *Attorney, Agent, or Firm* — Christopher J. Cronin

(57) ABSTRACT

A burner has a fuel/oxidant nozzles and a pair of dynamical lances spaced on either side thereof that inject a jet of fuel and primary oxidant along a fuel injection axis, and jets of secondary oxidant, respectively. Jets of actuating fluid impinge against the jets of secondary oxidant to fluidically angle the jets of secondary oxidant away from the fuel injection axis. The action of the angling away together with staging of the oxidant between primary and secondary oxidant injections allows achievement of distributed combustion conditions.

10 Claims, 13 Drawing Sheets

(56) References Cited

U.S. PATENT DOCUMENTS

| | | | |
|---|---|---|---|
| 6,007,326 | A | 12/1999 | Ryan, III et al. |
| 6,033,207 | A | 3/2000 | Cummings |
| 6,334,770 | B1 | 1/2002 | Giraud et al. |
| 6,394,790 | B1 | 5/2002 | Kobayashi |
| 6,471,506 | B1 * | 10/2002 | Zamansky et al. ............ 431/4 |
| 6,663,380 | B2 | 12/2003 | Rabovitser et al. |
| 6,702,569 | B2 * | 3/2004 | Kobayashi et al. ............ 431/10 |
| 6,773,256 | B2 | 8/2004 | Joshi et al. |
| 6,796,789 | B1 | 9/2004 | Gibson et al. |
| 7,029,271 | B2 | 4/2006 | Wunning et al. |
| 7,168,949 | B2 | 1/2007 | Zinn et al. |
| 7,484,956 | B2 * | 2/2009 | Kobayashi et al. ............ 431/10 |
| 2005/0239005 | A1 | 10/2005 | Lugnet et al. |
| 2007/0254251 | A1 * | 11/2007 | Cao et al. ............ 431/10 |
| 2007/0269755 | A2 | 11/2007 | Gibson et al. |
| 2010/0068666 | A1 | 3/2010 | Zamuner et al. |
| 2010/0092897 | A1 | 4/2010 | Wuenning |

FOREIGN PATENT DOCUMENTS

| | | |
|---|---|---|
| EP | 1 213 364 A2 | 6/2002 |
| EP | 1 850 067 | 10/2007 |
| EP | 1 850 067 A2 | 10/2007 |
| EP | 2 166 284 A2 | 3/2010 |
| WO | WO 97/44618 A1 | 11/1997 |
| WO | WO 2004/029511 | 4/2004 |
| WO | WO 2004/106807 | 12/2004 |
| WO | WO 2006/031163 | 3/2006 |
| WO | WO 2008/023011 | 2/2008 |
| WO | WO 2008 127 765 A2 | 10/2008 |

OTHER PUBLICATIONS

Delacroix, F. "The Flameless Combustion Mode: An Efficient Combustion Device Leading also to Very Low NOx Levels," Plenary Session on Efficiency in Power Generation, 2006.

Ristic, et al., "On the Potential of Flameless Oxidation to Reduce NOx Emissions from Pulverized Coal Combustion," Jan. 2011, Journal of IFRF, Apr. 2010.

Wunning, J.A., et al., "Flameless Oxidation to Reduce Thermal NO Formation," Progress in Energy and Combustion Science, vol. 23, pp. 81-94, 1997.

Wunning, J.G., Flameless Combustion and Its Applications, Technical Report, WS, Inc., 2004, pp. 1-12.

International Search Report and Written Opinion for PCT/US2011/066527, mailed Sep. 5, 2013.

* cited by examiner

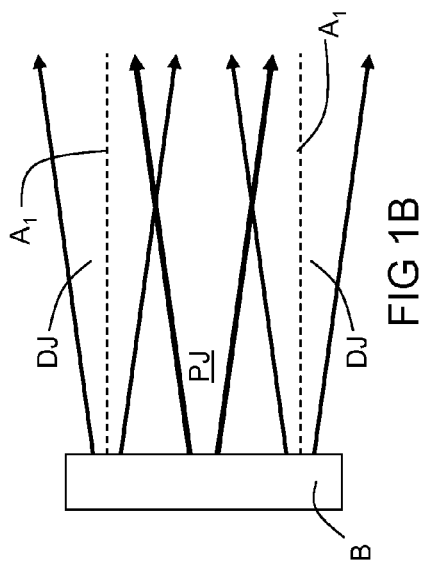
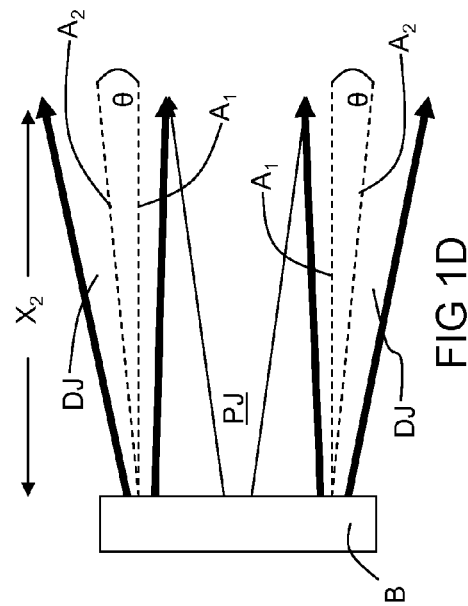
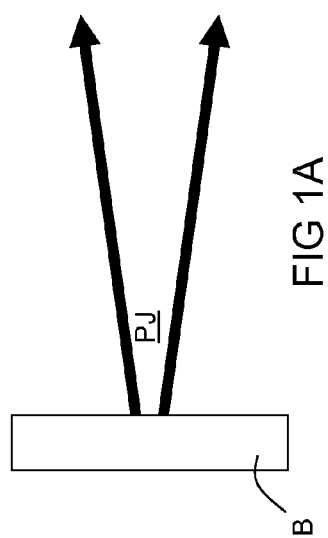
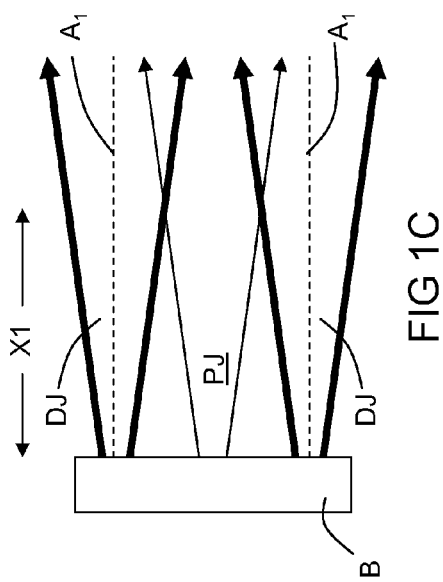

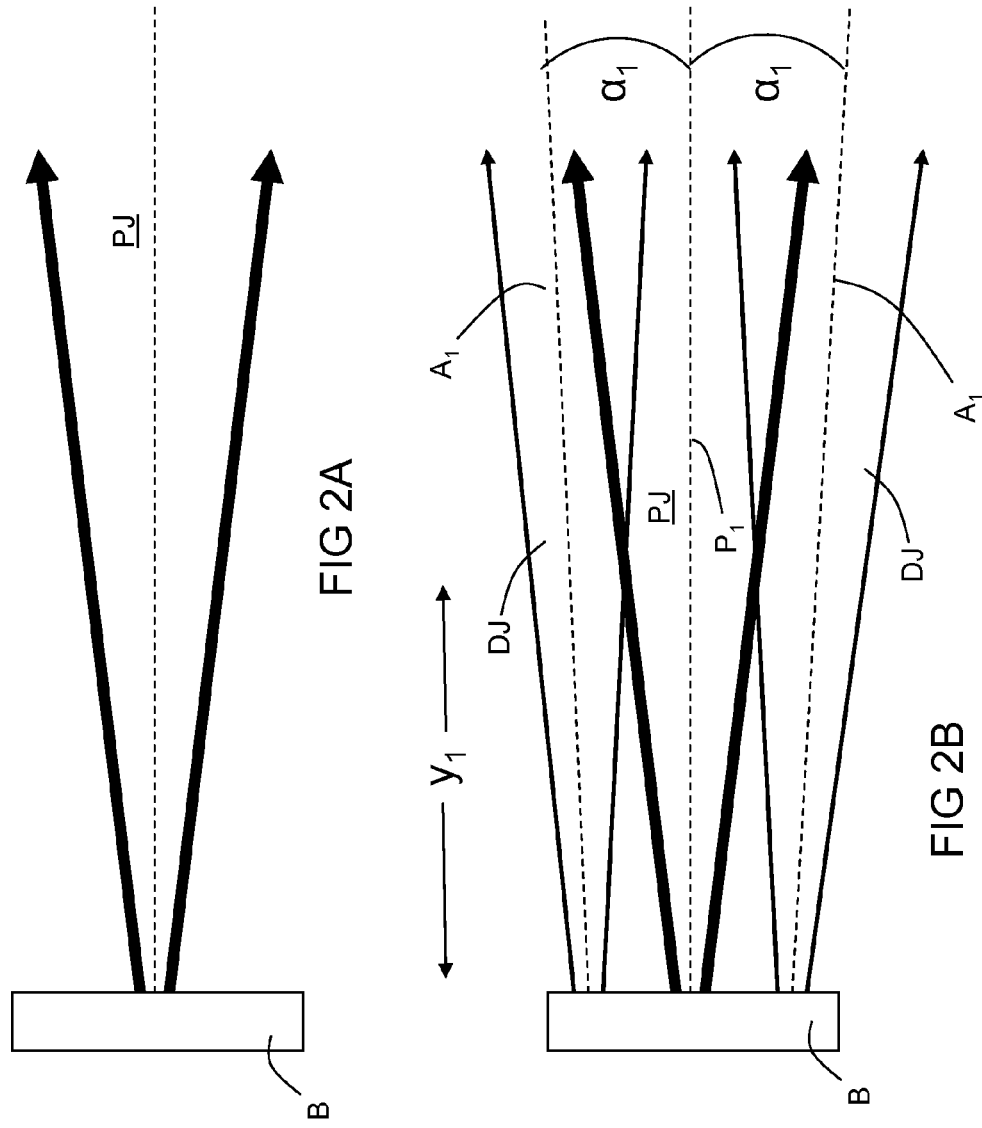

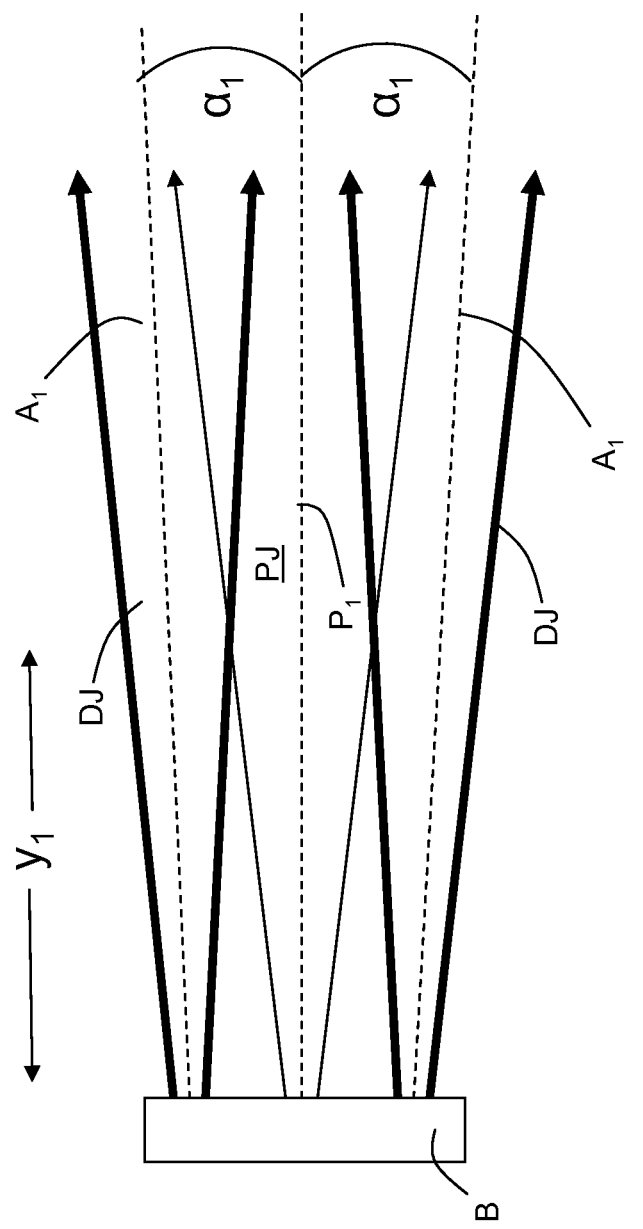

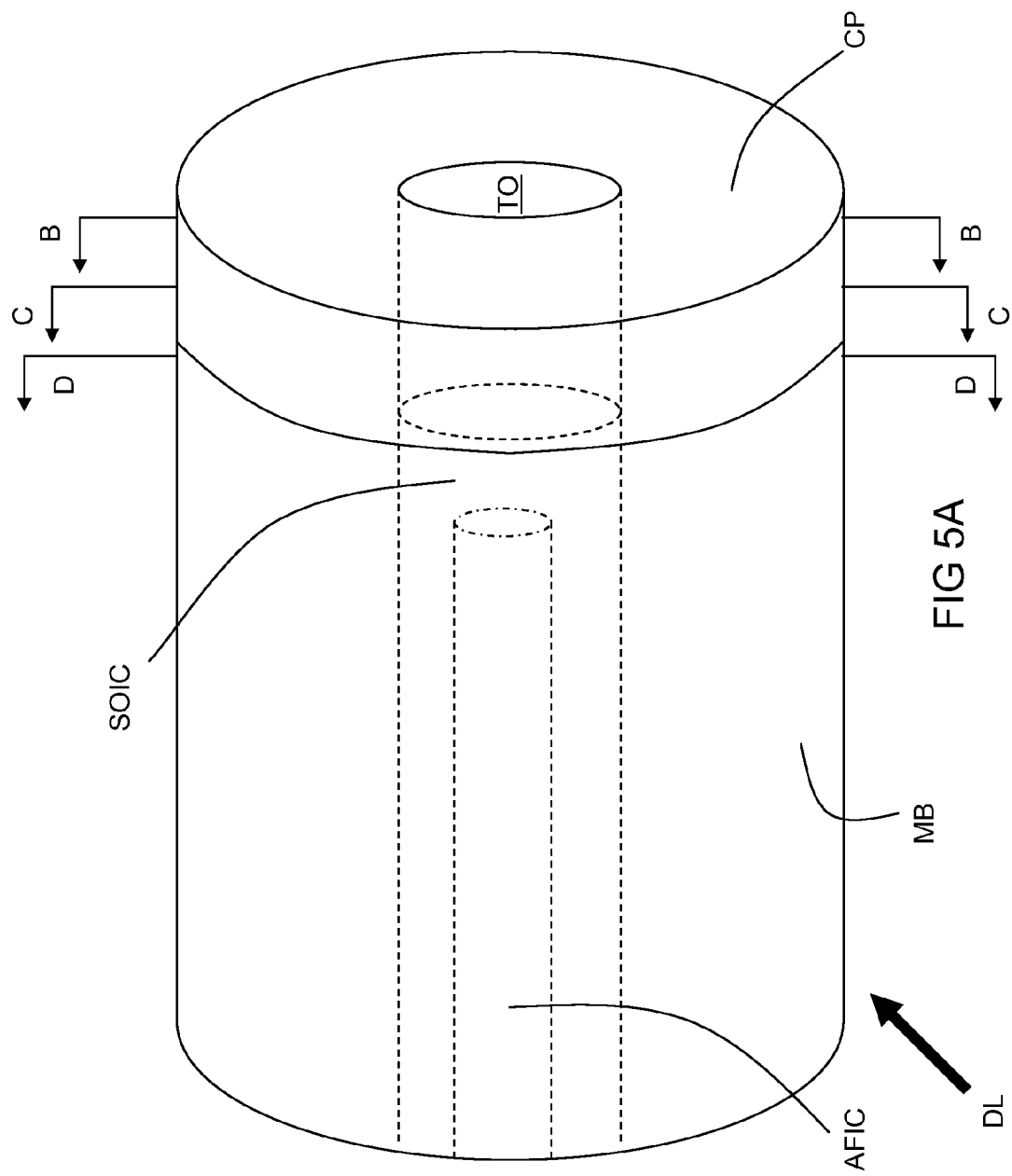

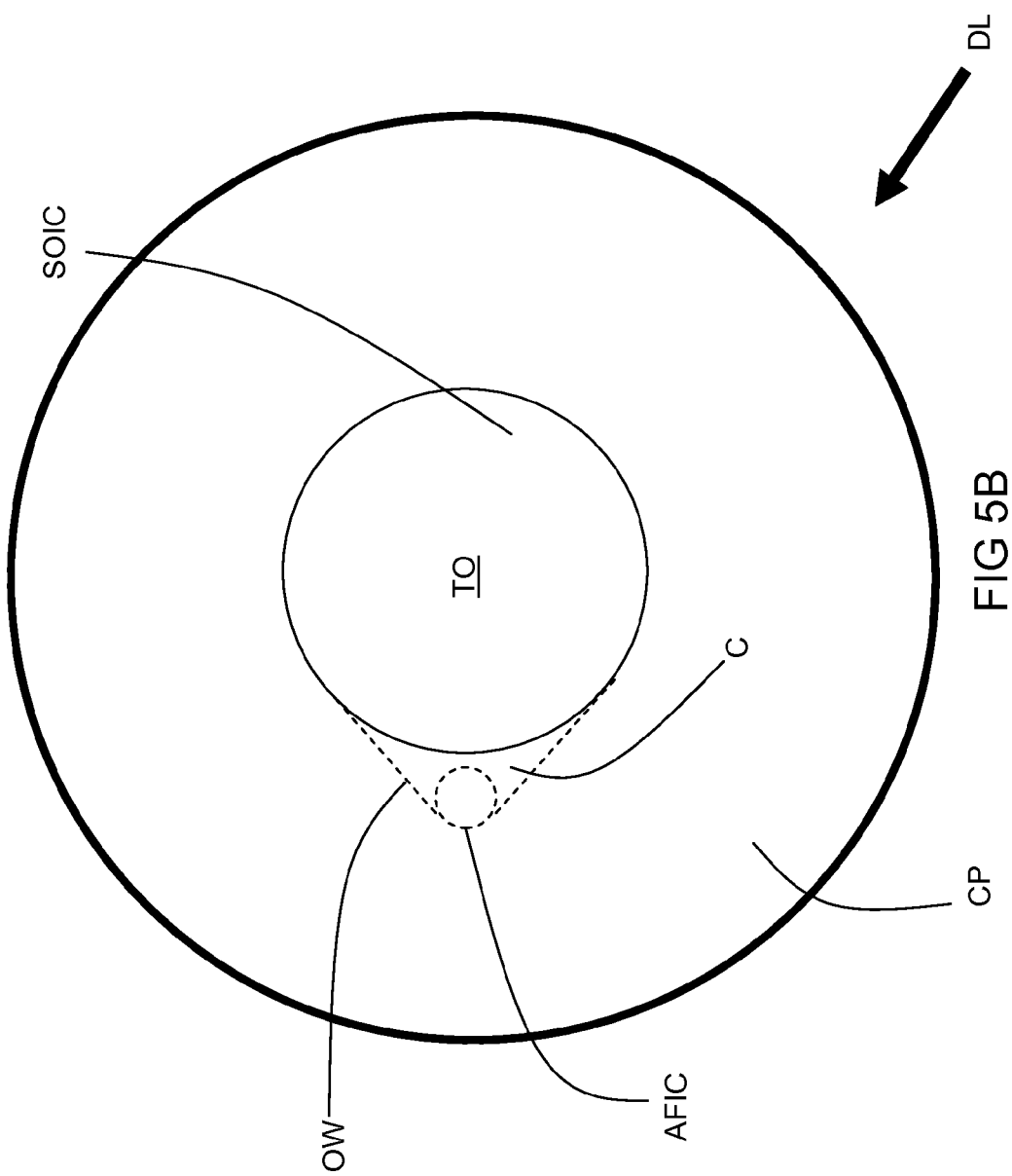

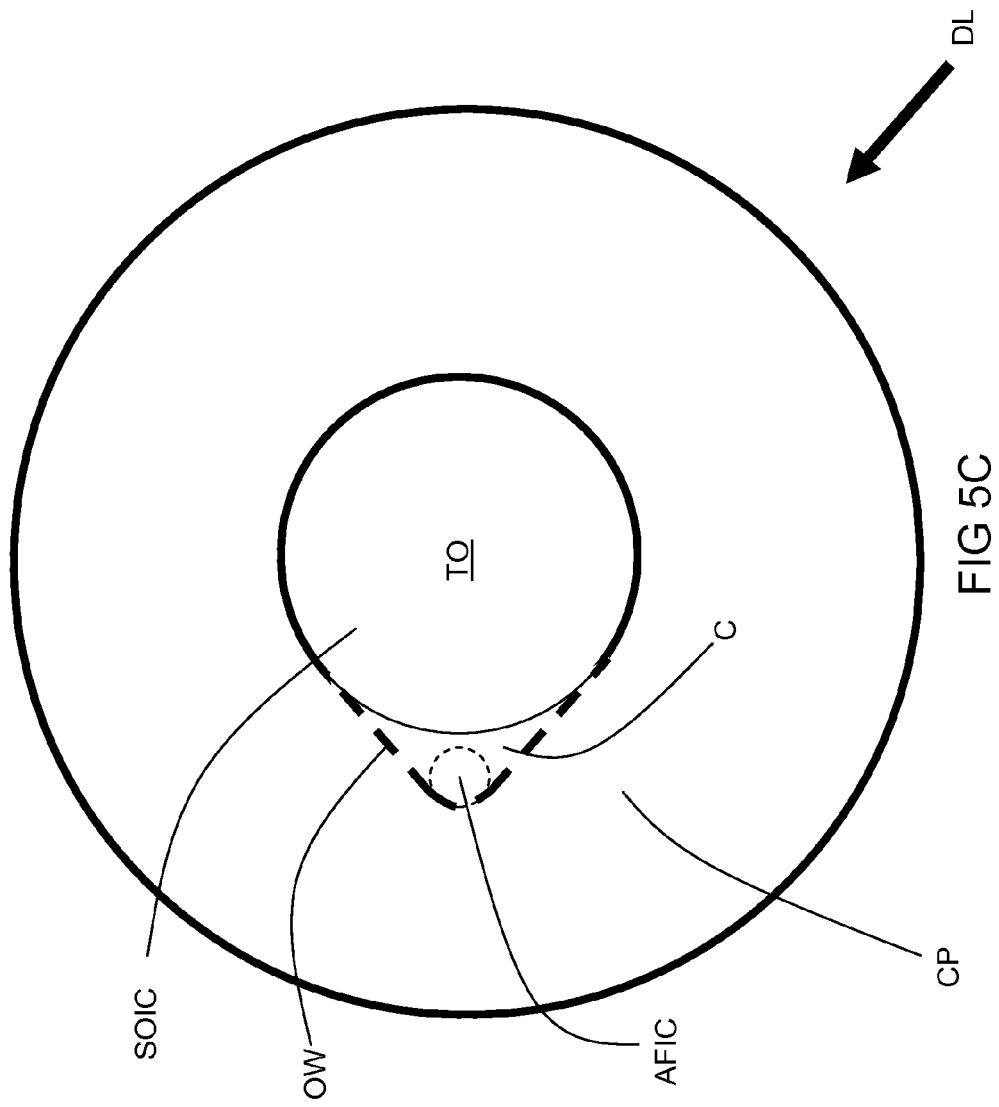

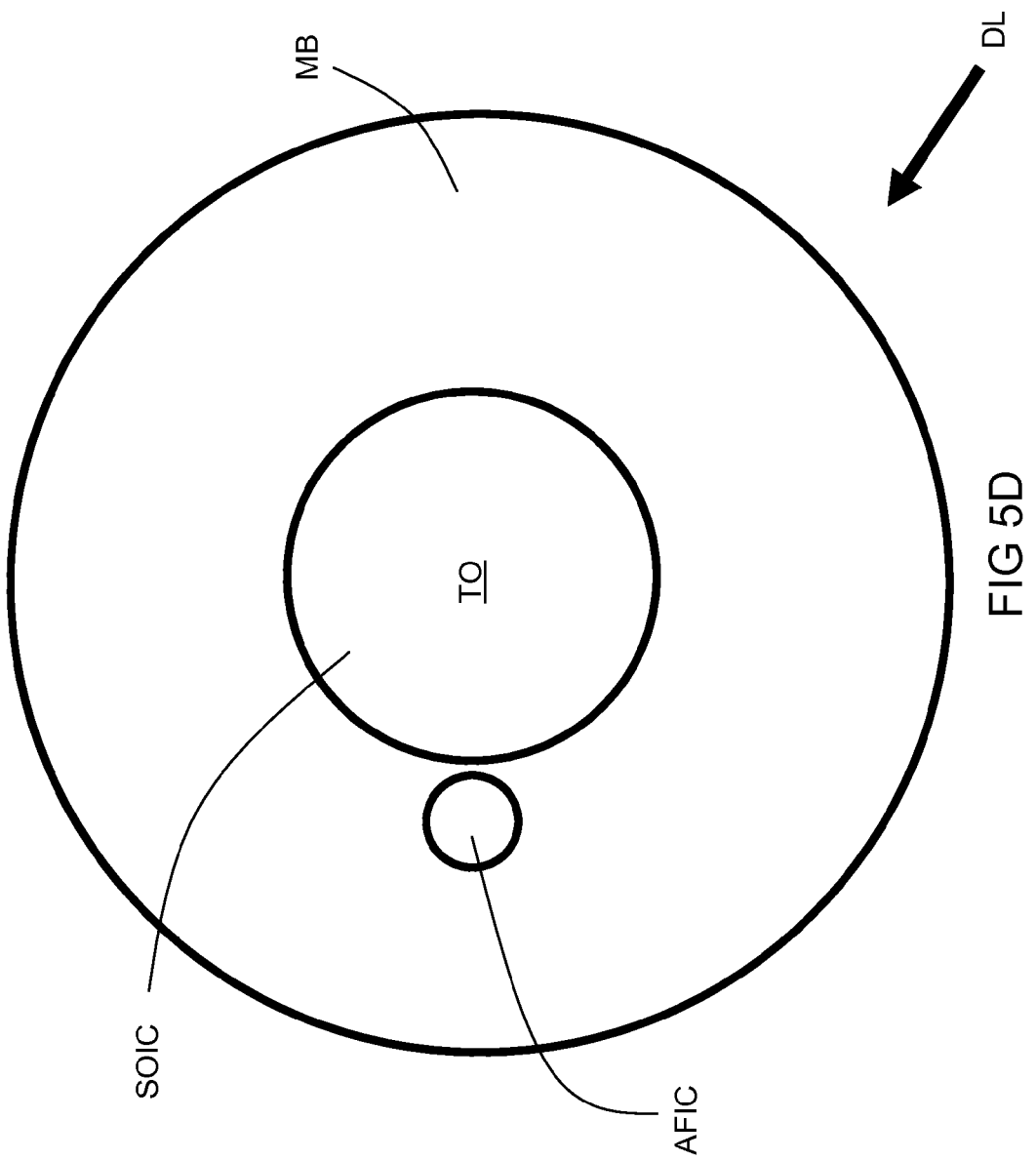

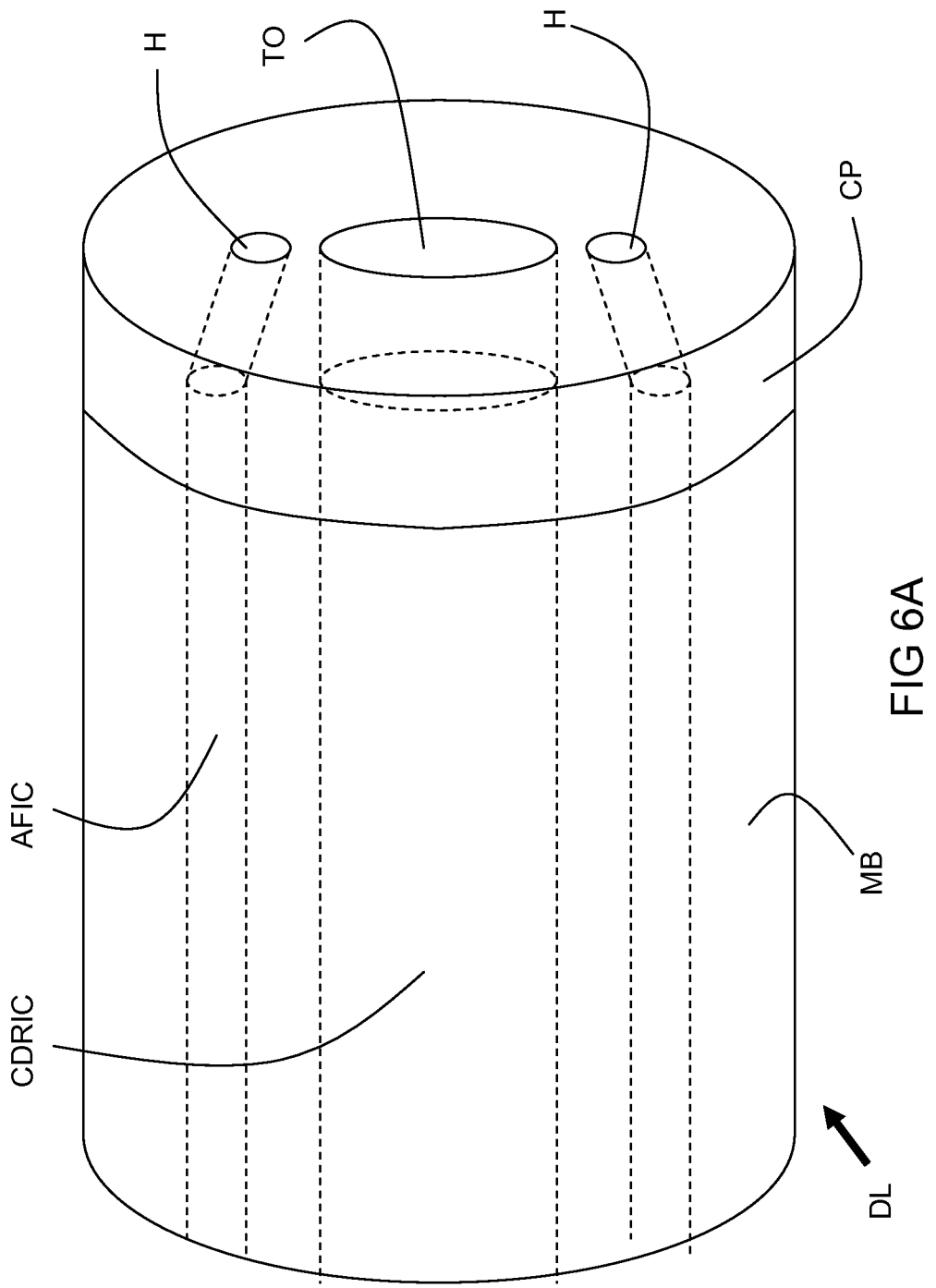

FLAMELESS COMBUSTION BURNER

CROSS-REFERENCE TO RELATED APPLICATIONS

Background

Oxy-combustion of fuels is a known strategy for increasing heat utilization (thermal efficiency) in industrial furnaces relative to air-based combustion. Oxy-fuel burners have higher flame temperatures which increase radiative heat transfer from the flame to the load. Higher flame temperatures, however, can have negative consequences in certain circumstances, especially for lower temperature furnaces such as for secondary Aluminum melting. Due to the high flame temperature, the propensity of $NO_x$ formation is increased. Therefore, if $N_2$ enters the combustion zone either through the fuel or due to air infiltration into the furnace, $NO_x$ formation can increase significantly. Also, the higher temperature flame can cause hot spots in the furnace or adversely affect the product quality. In certain cases like melting of Aluminum, the high flame temperature can also increase the rate of metal oxidation, thus resulting in metal losses.

To overcome the above issues, distributed combustion has been developed as a strategy for performing oxy-combustion at lower but very uniform temperatures. Also called diluted combustion, mild combustion, or flameless combustion (in certain circumstances when the flame is no longer visible), the central idea of this strategy is to dilute the reactants with furnace gases (mostly mixture of $H_2O$ and $CO_2$) before combustion so as to achieve a lower and more uniform temperature distribution within the furnace. The temperature of the diluted mixtures should be kept above auto-ignition temperature to sustain the flameless mode. Unlike complex interaction between mass transport and chemical reaction observed in conventional combustion processes, the highly diluted reactants make combustion a kinetic-limited process by increasing time scale of the combustion reaction. This slow combustion process manifests itself through highly distributed reaction zones where the peak temperature is low thereby reducing NOx drastically.

Many have proposed burners for distributed combustion. WO2004/029511 utilizes an ejector effect produced by a burner's oxygen nozzles to provide internal recirculation of furnace gases. Downstream injection of fuel allows the oxygen to mix with the furnace gases before reaching the fuel. WO2004/029511 includes 6 oxygen supply pipes placed in a circle around the fuel injection. The oxygen supply pipes preferably deliver oxygen at supersonic velocities.

As with the WO2004/029511 burner, U.S. Pat. No. 6,007,326 concerns combustion with low concentrations of both fuel and oxygen in the furnace. Dilution of the reactants is obtained with spatially separated injections of them at high velocities. The fuel and the oxidant can be preheated to any temperature above ambient.

U.S. Published Patent Application US 20070254251 discloses a burner designed for a flameless combustion regime. It includes several fuel and oxidant injections, playing different roles. A possible central flame stabilizer is surrounded by multiple nozzles for injecting fuel and gaseous oxidant into the furnace or combustion zone. It can use air or oxygen as oxidant.

Some distributed combustion burners utilizing oxygen must rely upon high velocity injections of the reactants. The high velocity injections normally require high pressures of oxygen and natural gas for operation. Because of this drawback, there is a need to achieve distributed combustion with a burner utilizing oxygen at relatively lower pressures.

Regardless of the pressure of the oxidant supply, distributed combustion is usually achieved by separated injection of fuel and oxidant into the furnace. Either one or both reactant jets are injected into the furnace in such a way as to facilitate entrainment of furnace gases into the jets, e.g. by using high velocity gradients, swirling flows or bluff bodies. The distance between the jets is determined with the objective of achieving sufficient dilution of one or both reactants before the two reactant streams interact/mix with each other. For example, U.S. Pat. No. 5,961,312 discloses a burner design wherein the distance between the fuel and air jets, L, is given by the equation: $(L/D_a) \times [(V_a/V_o)^{0.5}] > 10$, where $D_a$ is the diameter of the air nozzle, $V_a$ is the velocity of air and $V_o$ is unit velocity of air (1 m/s). Similarly, U.S. Pat. No. 6,007,326 requires a distance of at least 6 inches and preferably 24 inches between fuel and oxidant jets to achieve diluted combustion conditions for low $NO_x$ production. These spacing requirements between jets can often make burners prohibitively large and bulky.

Sometimes, a non-zero angle of injection between the reactant nozzles is also used to delay mixing of the reactants until they are diluted by furnace gases. For example, U.S. Pat. No. 5,772,421 discloses a burner design in which the fuel and oxidant are discharged such that they initially diverge away from each other but eventually mix within the furnace. However, the mixing of the diverging jets is dependent upon furnace geometry, burner operation and the location of the burner within the furnace. As a result, these burners are often effective only in certain specific furnaces and under specific operating conditions.

Another strategy to achieve distributed combustion is to distribute one of the reactants in the furnace by using multiple nozzles. The other reactant is usually supplied as a high velocity or high swirl jet to entrain furnace gases. For example, U.S. Pat. No. 6,773,256 discloses a burner in which a small quantity of fuel is supplied into the oxidant stream to achieve a fuel-lean flame. The remaining fuel is supplied via multiple fuel nozzles at fixed distances from the flame. The fuel nozzles can be designed to inject the fuel at different angles to the flame depending on the staging desired. Such a design strategy can result in a relatively large, complex burner that can be relatively expensive to manufacture and hard to control.

Because of the above-described drawbacks, there is a need to achieve distributed combustion with a simple, compact burner.

Even if burner compactness is not considered an important factor and a burner is optimized for a particular furnace configuration and for particular operating conditions, once the distance between fuel and oxidant injections is set, it is impossible to modify this distance in conventional burners with fixed injections of fuel and oxidant. This becomes important if it is desirable to provide a single burner design capable of combusting gaseous, liquid, and solid fuels. This is because different fuels have different the optimal injection conditions. This difference among optimal injection conditions even exists between different types of a single general class of fuels, such as pulverized coal.

Because of the above-described drawbacks, there is a need to achieve distributed combustion with different types of fuels with a single burner design.

One of the important conditions for achieving highly staged combustion is high furnace temperature. In order to maintain complete combustion inside the combustion chamber for highly staged combustion, the furnace must be preheated to above 800° C. Most of the highly staged burners require a preheater burner for achieving desired furnace temperatures prior to staging. For example, WO 2006/031163 discloses a burner that can be operated in both flame and staged mode. Initially when the furnace is cold, fuel and oxidant are injected from coaxial opening (pipe-in-pipe) to have a stable flame. Once the furnace temperature reaches the auto-ignition temperature of fuel, the fuel and oxidant are injected from openings that are spatially separated from each other to have a distributed combustion inside the furnace. The issue with almost all of the staged burner designs is their often poor performance at burner powers other than nominal design power. Typically these burners operate very well at nominal power conditions, however, their combustion efficiency and emission characteristics often decline significantly the moment burner power is changed from nominal to some other power. Such a change in burner power is a very common scenario for most industrial furnaces.

Because of the above-described drawback, there is also a need for a burner that can achieve satisfactory distributed combustion at a variety of burner powers.

SUMMARY

There is disclosed a method of performing distributed combustion, comprising the following steps. Fuel is injected into a furnace along a fuel injection axis from a fuel nozzle disposed in a burner block. Oxidant is injected into the furnace from a primary oxidant nozzle, the fuel and primary oxidant nozzles being concentrically disposed with respect to one another. The fuel and primary oxidant are combusted in the furnace. An amount of the oxidant injected from the primary oxidant is decreased. First and second jets of the oxidant are injected into the furnace from first and second dynamical lances disposed on opposite sides of the fuel nozzle in the burner block. First and second jets of actuating fluid are injected at angles to the first and second jets of oxidant, respectively, such that the first and second jets of secondary oxidant are fluidically angled away from the fuel injection axis.

There is also disclosed a burner for performing distributed combustion, comprising: a burner block having a first face adapted to face away from a combustion space and a second face adapted to face towards a combustion space; a fuel/oxidant nozzle extending from the first face to the second face, the fuel/oxidant nozzle comprising an inner tube concentrically disposed within an outer tube, the fuel/oxidant nozzle adapted to inject fuel and primary oxidant into a furnace along a fuel injection axis; and first and second dynamical lances equally spaced from the fuel/oxidant nozzle and extending from the first face to the second face. Each of the first dynamical lance comprises: a main body with an inlet end adjacent the first face and a terminal end facing the second face, extending through the main body from the first face of the burner block to the main body terminal end are a secondary oxidant injection channel and an actuating fluid injection channel, the actuating fluid injection channel being disposed on a side of the secondary oxidant injection channel away from the fuel/oxidant nozzle; and a cap disposed over the main body terminal end, the cap having a mating end adapted to mate with the main body terminal end and a terminal end adjacent the second face, the cap further having an opening in the cap terminal end that is sized to correspond to an inner diameter of the outer tube and is adapted to allow a jet of secondary oxidant to emerge from the secondary oxidant injection channel and out of the terminal end opening. The cap is configured to provide fluid communication between the actuating fluid injection channel and the cap terminal end and is adapted to allow a jet of actuating fluid to impinge against a jet of secondary oxidant from the secondary oxidant injection channel to angle the jet of secondary oxidant away from the fuel injection axis.

There is also disclosed a burner system for performing distributed combustion comprising the above-disclosed burner, a source of fuel in fluid communication with the fuel/oxidant nozzle, and a source of oxidant in fluid communication with the fuel/oxidant nozzle and the dynamical lances.

The method, burner, and/or burner system may include one or more of the following aspects:

- the fuel is gaseous.
- the fuel is atomized liquid.
- the fuel is pulverized solids.
- the fuel is pulverized coal.
- the pulverized coal is fluidized and injected with a conveying gas of air or recycled flue gas.
- amounts of the fuel and oxidant injected into the furnace are increased while amounts of actuating fluid injected as first and second actuating fluid jets are increased thereby decreasing the degree to which the first and second jets of secondary oxidant are fluidically angled away from the fuel injection axis.
- an additional portion of secondary oxidant is injected from first and second low speed oxidant lances disposed above and below the fuel nozzle, respectively, wherein the additional portion of secondary oxidant is injected at a velocity less than that from the first and second dynamical lances.
- combustion of the fuel and oxidant produces no visible flame.
- the fuel and the first and second jets of secondary oxidant are injected parallel to one another before injection of the actuating fluid is initiated.
- before injection of the actuating fluid is initiated, the first and second jets of secondary oxidant are injected away from the fuel injection axis at an angle; and after injection of the actuating fluid is initiated, the first and second jets of secondary oxidant are injected away form the fuel injection axis at a greater angle.
- each of the caps further comprises a cavity in fluid communication between the respective actuating fluid injection channel and cap terminal opening; and the actuating fluid injection channels, secondary oxidant injection channels, cavities, and terminal openings are configured and adapted such that the jet of actuating fluid impinges against the jet of secondary oxidant before the secondary oxidant exits the terminal opening.
- each of the caps further comprises a hole extending between the respective actuating fluid injection channel and the cap terminal end; and the actuating fluid injection channels, secondary oxidant injection channels, holes, and terminal openings are configured and adapted such that the jet of actuating fluid impinges against the jet of secondary oxidant after the secondary oxidant exits the terminal opening.
- each of the secondary oxidant injection channels extends along an axis forming an angle to the fuel injection axis.
- each of the secondary oxidant injection channels extends along an axis parallel to the fuel injection axis.
- the oxidant is industrially pure oxygen.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1A is a schematic of a first step of a first embodiment of the inventive method wherein only primary fuel and oxidant are injected from a burner block.

FIG. 1B is a schematic of a second step of the first embodiment of the inventive method wherein injection of secondary oxidant is initiated.

FIG. 1C is a schematic of a third step of the first embodiment of the inventive method wherein a desired degree of staging of the secondary oxidant is achieved.

FIG. 1D is a schematic of a fourth step of the first embodiment of the inventive method wherein the secondary oxidant is angled away from the fuel injection axis via actuating jets.

FIG. 2A is a schematic of a first step of a second embodiment of the inventive method wherein only primary fuel and oxidant are injected from a burner block.

FIG. 2B is a schematic of a second step of the second embodiment of the inventive method wherein injection of secondary oxidant is initiated.

FIG. 2C is a schematic of a third step of the second embodiment of the inventive method wherein a desired degree of staging of the secondary oxidant is achieved.

FIG. 5A is an isometric schematic of a first embodiment of a dynamical lance illustrating hidden parts.

FIG. 5B is a cross-sectional view of the dynamical lance of FIG. 5A taken along line B-B.

FIG. 5C is a cross-sectional view of the dynamical lance of FIG. 5A taken along line C-C.

FIG. 5D is a cross-sectional view of the dynamical lance of FIG. 5A taken along line D-D.

FIG. 6A is an isometric schematic of a second embodiment of a dynamical lance illustrating hidden parts.

DESCRIPTION OF PREFERRED EMBODIMENTS

Figure 2D:
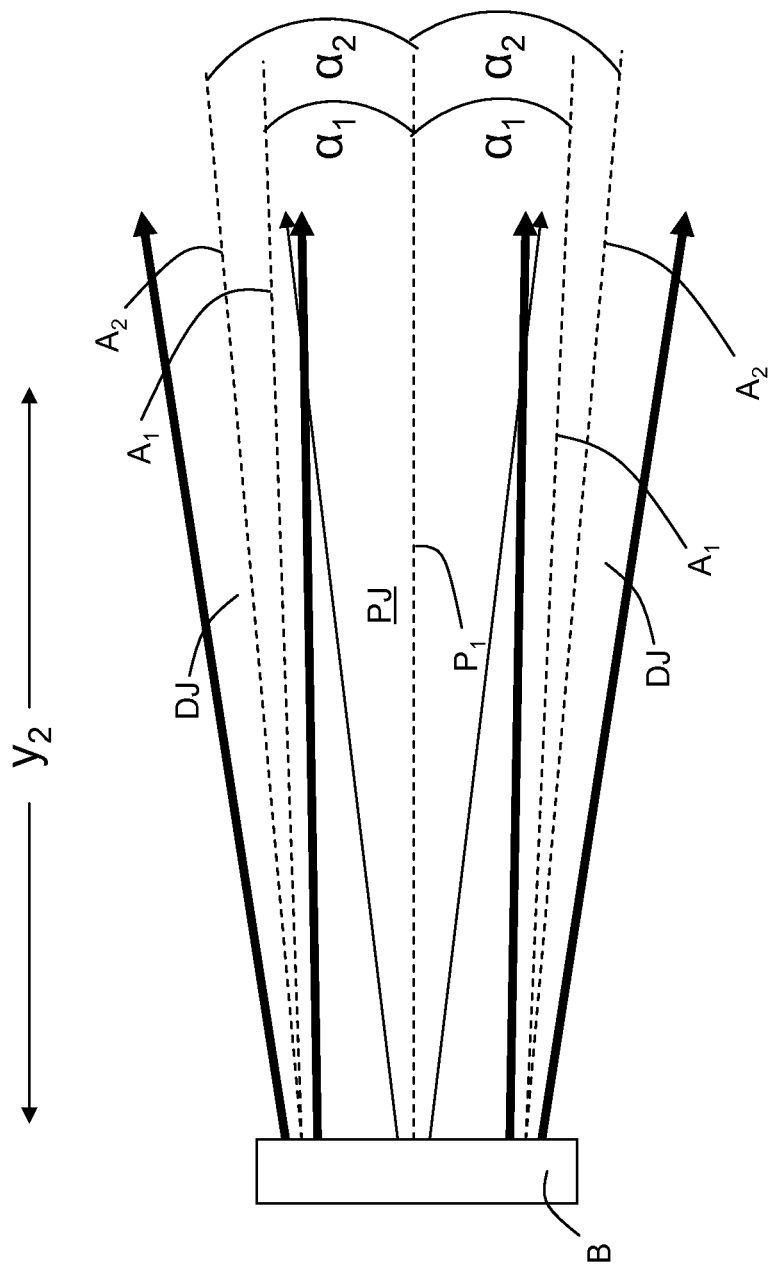
FIG. 2D is a schematic of a fourth step of the second embodiment of the inventive method wherein the secondary oxidant is angled away from the fuel injection axis via actuating jets.

There is disclosed a simple, compact burner for distributed combustion that is capable of wide distribution of oxidant in a furnace through fluidic vectoring of secondary oxidant jets achieved with use of dynamical lances.

The dynamical lances utilize further portions of oxidant instead of moving mechanical parts in order to change the directions of the injected jets of secondary oxidant away from the jet of fuel. Hence, the oxidant is spread out over a much larger volume than that achieved with secondary oxidant nozzles having a fixed axis of injection. By spreading the oxidant over a much larger volume, the burner may be operated in a distributed combustion mode exemplified by greater furnace temperature uniformity as well as a lower furnace temperature maximum. The distributed combustion mode may also be enhanced by decreasing the primary oxidant flow to zero or near zero flow and simultaneously injecting a corresponding amount of oxidant from low speed oxidant nozzles disposed above and below the fuel and oxidant nozzles.

One advantage provided by the inventive burner is its adaptability for injecting a wide variety of fuels. The burner may inject either solid particulate, liquid, or gaseous fuel. The solid particulate fuel is typically pulverized coal that is fluidized and conveyed with a conveying gas of air or recycled furnace/flue gas according to well known techniques in the art. The conveying gas typically has an oxygen content of about 5% vol/vol at the minimum burner power. The liquid fuel is typically fuel oil which is injected at a velocity sufficient to atomize it into a spray. Techniques for injecting atomized fuel oil are well known to those skilled in the art. The gaseous fuel is typically natural gas.

Another advantage provided by the burner is its compact size. Conventional highly staged or distributed combustion burners require wide spacing in between the fuel and secondary oxidant injections in order to achieve greater entrainment of furnace gases and delayed mixing of the oxidant and fuel before complete combustion thereof. Thus, conventional burner blocks can be relatively large. While the inventive burner still allows for greater entrainment of furnace gases and delayed mixing of fuel and oxidant, it does so by placing the injection points relatively closer and angling the jets of secondary oxidant away from the jet of fuel.

Yet another advantage provided by the burner is its adaptability to various furnace geometries. The geometry of the furnace and the burner power may have an effect upon the degree of furnace gas entrainment within the angled jet of secondary oxidant. In other words, if the jet is angled to too high a degree and the furnace wall is close enough to the jet, the otherwise full extent to which the furnace gas could be entrained can be limited. If the furnace geometry does not limit the angled jet is such a manner, then generally speaking, the greater the degree to which the jet is angled, the greater it becomes diluted with furnace gases, the lower the overall furnace temperature becomes, and the greater the furnace temperature becomes homogenous.

Still another advantage provided by the burner is its ability to achieve desirable fuel and oxidant mixing over a relatively wide range of burner powers. Take the case of a distributed combustion burner having spatially separated reactant injections whose reactant injection angles are fixed with respect to one another. Such burner designs are driven by the need for achieving distributed combustion at a typical burner power. When the power of such a conventional burner is decreased from its optimized power, the relatively lower pressure injections of reactants along fixed angles (or parallel to one another) will tend to increase mixing of the reactants with furnace gases before mixing with one another, thereby leading to an unstable flame. On the other hand, when the power of such a conventional burner is increased from the optimized power, the relatively higher pressure injections along fixed angles (or parallel to one another) will tend to mix less with furnace gases before the reactants mix together, thereby leading to hot spots in the flame and furnace. This is especially an issue for solid particulate fuel like pulverized coal where total burn-out may not occur before the partially combusted coal particles strike the opposite furnace wall. To address these problems, optimal mixing of the fuel and oxidant and optimal entrainment of furnace gases may be maintained as the burner power is changed simply by varying the degree to which the jets of secondary oxidant are angled from the jet of fuel. In practice, excessive furnace gas entrainment and flame instability at relatively lower burner powers may be avoided by decreasing the degree to which the jet of secondary oxidant is angled away from the jet of fuel. Also, the creation of hotspots or impingement of the particulate coal on the furnace wall before total burnout at relatively higher burner powers may be avoided by decreasing the degree to which the jet of secondary oxidant is angled away from the jet of fuel. Because the oxidant and fuel are mixed sooner, more complete combustion may be achieved without over-impingement of the products of combustion upon the opposite furnace wall.

While the burner may be used a wide variety of processes, operation of it is especially beneficial in combustion processes involving a melting phase followed by a refining phase such as for the melting and refining of solid charges like glass and metal.

During a first phase (the heating phase) of operation of the inventive burner, fuel and primary oxidant are injected through a tube-in-tube type fuel/oxidant nozzle as a jet of one reactant enshrouded by the other reactant into the combustion chamber (such as an industrial furnace) where they are combusted. While this enshrouded jet may include a central jet of primary oxidant enshrouded by fuel, more typically it is a central jet of fuel enshrouded by primary oxidant. During the heating phase, while the secondary oxidant may be injected from dynamical lances on opposite sides of the fuel/oxidant nozzle, typically it is not.

The heating phase may be continued until an auto-ignition temperature of the fuel and oxidant is reached. For gaseous fuels such as natural gas, this is typically greater than 700° C. or greater than 800° C.

First and second dynamical lances equally spaced on opposite sides of the fuel/oxidant nozzle supply the secondary oxidant. In order to ultimately achieve distributed combustion, while the injection of primary oxidant from the fuel-oxidant nozzle is reduced, injection of the secondary oxidant is initiated during a transition from the heating phase to a second phase of operation (distributed combustion phase). If a same overall flow rate of oxidant into the furnace is desired, the increase of secondary oxidant injection will correspond to the decrease of the primary oxidant injection. As this transition from the heating phase to the distributed combustion phase is continued, the amount of secondary oxidant is further increased and the amount of the primary oxidant is further decreased. This continues until a desired portion (i.e., desired staging) of oxidant is being injected as the secondary oxidant (from the dynamical lances) in comparison to the amount of the primary oxidant (from the fuel/oxidant nozzle).

During the transition from the first to second phase, a valve is opened to allow a flow of actuating fluid through actuating fluid injection channels each one of which is disposed adjacent to the secondary oxidant injection channels on a side thereof opposite the fuel/oxidant nozzle. The flow of actuating fluid impinges the flow of secondary oxidant at an angle. Due to the angular relationship between the actuating fluid and secondary oxidant flows, the jets of secondary oxidant are angled away from the jet of fuel in comparison to the initial axes along which the secondary oxidant jets were injected before initiating the actuating fluid injection.

Optionally and at some point between the beginning and end of the transition from the first to the second phase, the flow rate of the primary oxidant may be reduced to zero and a corresponding amount of the overall oxidant may be injected from a pair of low speed lances, one of which is disposed above the fuel/oxidant nozzle and the other of which is disposed below the fuel/oxidant nozzle. If this option is selected, the velocity of the dynamical jets of secondary oxidant is typically greater than 60 m/s while the velocity of the low speed secondary oxidant injection is lower than that of the secondary oxidant jets but typically at least 5 m/s. We have found that injection of low speed oxidant in place of the primary oxidant allows for the achievement of flameless combustion where no visible flame is observed.

At the conclusion of the transition from the heating phase to the distributed combustion phase, the desired degree of angling of the secondary oxidant jets is reached, the desired degree of staging of the oxidant between primary and secondary oxidant is reached, and the optional injection of low speed oxidant is performed. These conditions may be continued through the distributed combustion phase. During the distributed combustion phase, typically 90-95% of the overall amount of oxidant is injected as the secondary oxidant while only 10-5% is injected as the primary oxidant. If desired, the degree of staging may be varied in an empirical manner until the flame is no longer visible flame and flameless combustion is achieved. Lower degrees of staging are also possible, depending upon the degree of distributed combustion desired. Additionally, lower degrees of staging may be desirable if a relatively shorter flame is necessary due to furnace geometry constraints.

The flow rate of the actuating fluid is typically 1-20% of the total flow of oxidant from the dynamical lance. The velocity of the actuating fluid is typically 100 m/s or less at nominal burner power, while the fuel and primary oxidant velocities are typically 100-200 m/s and 75-150 m/s, respectively, at nominal burner power.

While the oxidant may be air, industrially pure oxygen, or oxygen-enriched air, typically it is industrially pure oxygen having a purity of at least 90% (by volume). The primary oxidant typically comprises 75-100% of the total oxidant flow rate of the burner during the first phase, but only 0-10% of the total oxidant flow rate of the burner above the auto-ignition temperature (typically 0-10% of the total oxidant flow rate above 850° C.) during the second phase. On the other hand, the secondary oxidant typically has a velocity of 75-200 m/s at nominal burner power and comprises 0-25% of the total oxidant flow rate of the burner during the first phase, but comprises as much as 90-100% at combustion chamber temperatures above the auto-ignition temperature (typically 90-100% of the total oxidant flow rate above 850° C.) during the second phase.

The actuating fluid may be a further portion of oxidant, air, or an inert gas such as Argon or recycled flue gas.

While the dynamical lances may be separated from the fuel/oxidant nozzle by any distance desired which still allows production of a stable flame, typically, the center of each dynamical lance is separated from a center of the fuel/oxidant nozzle by about six times the inside diameter of the innermost tube of the fuel/oxidant nozzle. This distance ordinarily produces a sufficient degree of mixing between the secondary oxidant and the furnace gases.

Since the jets are highly turbulent, we can assume the jet spread rate is not a function of the Reynolds number Re. Therefore, a jet diameter can be written as equation (1):

$$(r_{1/2})/(x) = 0.08468 \qquad (I)$$

where x is the axis of a jet and $r_{1/2}$ is the jet radius at which the axial velocity has fallen to half its centerline value. Using the above equation, the distance where two jets meet can be calculated. The density difference between a jet and ambient gas is not included in this calculation. Nevertheless, this calculation may be appropriate as a first approximation. When a turbulent jet travels a distance x, the formula for the ratio of jet and entrained mass flow rate is presented may be written as equation (II):

$$M_x/M_o = 0.32(\rho_1/\rho_o)^{0.5} x/d_o \text{ where}$$

Mo: Mass flow rate of a jet,
Mx: Integrative mass flow rate of entrainment up to x,
do: jet diameter,
$\rho_1$: Ambient density, and
$\rho_o$: Jet density.

If a value of 72 mm is used for x in equation (II), the value of $M_x/M_o$ is 4.72. This represents the least amount of dilution a jet has to have. In order to obtain the same dilution for a higher burner power, a jet has to travel a longer distance. For a burner power of 2 MW, the jet has to travel 650 mm. This yields a distance between the fuel/oxidant nozzle and the secondary lance of 87 mm. Such a distance may result in a burner size that is undesirably large. In order to reduce the size of such an undesirably large burner, the dynamical lances may be oriented at a slight angle (such as 15) away from the fuel injection axis. This angling reduces the distance between the fuel/oxidant nozzle and the dynamical lances to only 45 mm~a decrease of almost 50%. In this way, we can keep the minimum distance (for example 650 mm) where the two reactants meet without increasing spacing between the fuel/oxidant nozzle and dynamical lances. One of ordinary skill in the art will recognize that the above concepts may be applied to achieve a desired distance at which the jets meet for a given burner power.

A first embodiment of the inventive process is illustrated in FIGS. 1A-D. As best shown in FIG. 1A, during the first (e.g., heating) phase of the combustion process, a primary jet PJ of enshrouded jet of fuel and oxidant is injected from the burner block B. The entire amount of oxidant is injected in the primary jet PJ. As best shown in FIG. 1B, during the transition from the first (e.g., heating) phase to the second (e.g., distributed combustion) phase, staging of the oxidant between primary and secondary portions is started by initiating injection of the secondary oxidant as dynamical jets DJ along initial injection axes $A_1$. The darker lines of the primary jet PJ indicate a relatively greater proportion of the total oxidant in comparison to the relatively lesser proportion of the total oxidant injected as the dynamical jets DJ with correspondingly lighter lines. As best shown in FIG. 1C, the transition continues to the desired degree of staging between primary and secondary oxidants with the darker lines of the dynamical jets DJ and the relatively lighter lines of the primary jet PJ indicating the relatively greater and lesser proportions of total oxidant injected as secondary and primary oxidant streams, respectively. As best shown in FIG. 1D, injection of the actuating jets is initiated with the result that the dynamical jets DJ are injected along respectively axes A2 which form angles θ to the respective axes A1. This angling away of the dynamical jets DJ of secondary oxidant from the injection axis of the primary jet PJ together with the staging of the oxidant between primary and secondary streams results in distributed combustion. Although not illustrated, the amounts of oxidant injected as primary and secondary oxidant may be decreased and a corresponding amount of oxidant may be injected at relatively lower velocities from two low speed oxidant lances, one of which is disposed above the fuel/oxidant nozzle and one of which is disposed below the fuel/oxidant nozzle.

A second embodiment of the inventive process is illustrated in FIGS. 2A-D. As best shown in FIG. 2A, during the first (e.g., heating) phase of the combustion process, a primary jet PJ of enshrouded jet of fuel and oxidant is injected from the burner block B along fuel injection axis $P_1$. The entire amount of oxidant is injected in the primary jet PJ. As best shown in FIG. 2B, during the transition from the first (e.g., heating) phase to the second (e.g., distributed combustion) phase, staging of the oxidant between primary and secondary portions is started by initiating injection of the secondary oxidant as dynamical jets DJ along initial injection axes $A_1$. The injection axes A1 are angled from the fuel injection axis P1 by respective initial angles $\alpha_1$. The darker lines of the primary jet PJ indicate a relatively greater proportion of the total oxidant in comparison to the relatively lesser proportion of the total oxidant injected as the dynamical jets DJ with correspondingly lighter lines. As best shown in FIG. 2C, the transition continues to the desired degree of staging between primary and secondary oxidants with the darker lines of the dynamical jets DJ and the relatively lighter lines of the primary jet PJ indicating the relatively greater and lesser proportions of total oxidant injected as secondary and primary oxidant streams, respectively. As best shown in FIG. 2D, injection of the actuating jets is initiated with the result that the dynamical jets DJ are injected along respectively axes A2 which form respective angles $\alpha_2$ to the fuel injection axis $P_1$ where $\alpha_2 > \alpha_1$. This further angling away of the dynamical jets DJ from the injection axis of the primary jet PJ together with the staging of the oxidant between primary and secondary streams results in distributed combustion. Although not illustrated, the amounts of oxidant injected as primary and secondary oxidant may be decreased and a corresponding amount of oxidant may be injected at relatively lower velocities from two low speed oxidant lances, one of which is disposed above the fuel/oxidant nozzle and one of which is disposed below the fuel/oxidant nozzle.

Figure 3:
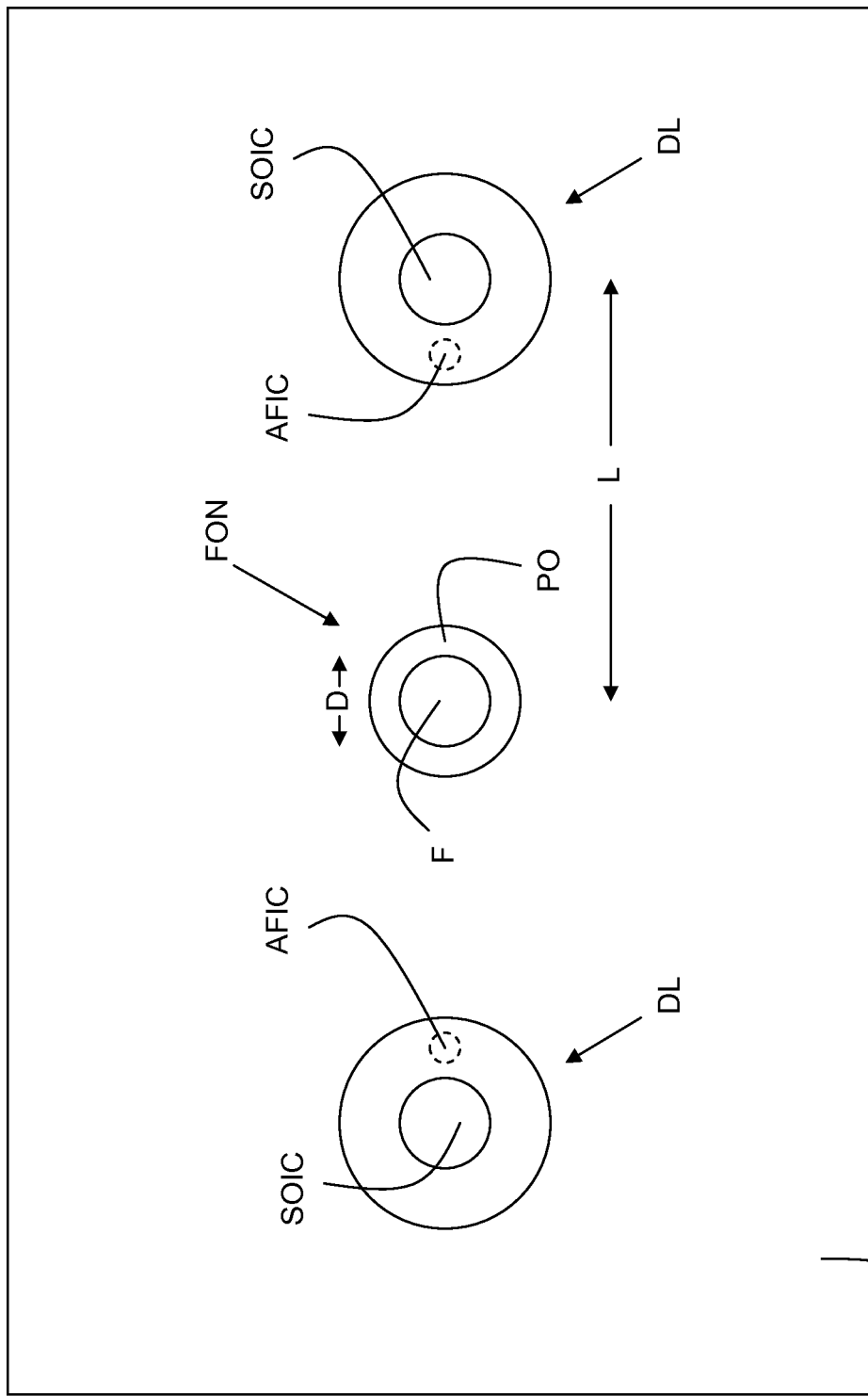
FIG. 3 is a front elevation schematic illustrating hidden parts of a first embodiment of the inventive burner that does not include low speed oxygen lances.

As best illustrated in FIG. 3, a first embodiment of a burner B includes a tube-in-tube type fuel/oxidant nozzle FON that injects fuel from the inner tube and primary oxidant from the outer tube. A pair of dynamical lances DL are equally spaced on opposite sides of the fuel/oxidant nozzle FON. Each dynamical lance DL includes a secondary oxidant injection channel SOIC and an actuating fuel injection channel extending adjacent thereof on a side opposite that of the fuel/oxidant nozzle FON. In the case of dynamical lances DL that are configured to inject jets of secondary oxidant parallel to the jet of fuel and oxidant before injection of the actuating fluid is initiated, a distance L between the center of the dynamical lance DL and the center of the fuel/oxidant nozzle is typically at least 6 times the diameter of the innermost tube of the fuel/oxidant nozzle FON. As described above, the distance L may be decreased to a value less than 6 times the diameter of the innermost tube if the dynamical lances DL are configured to inject the secondary oxidant jets at angles away from the jet of fuel and primary oxidant before injection of the actuating fluid is initiated.

Figure 4:
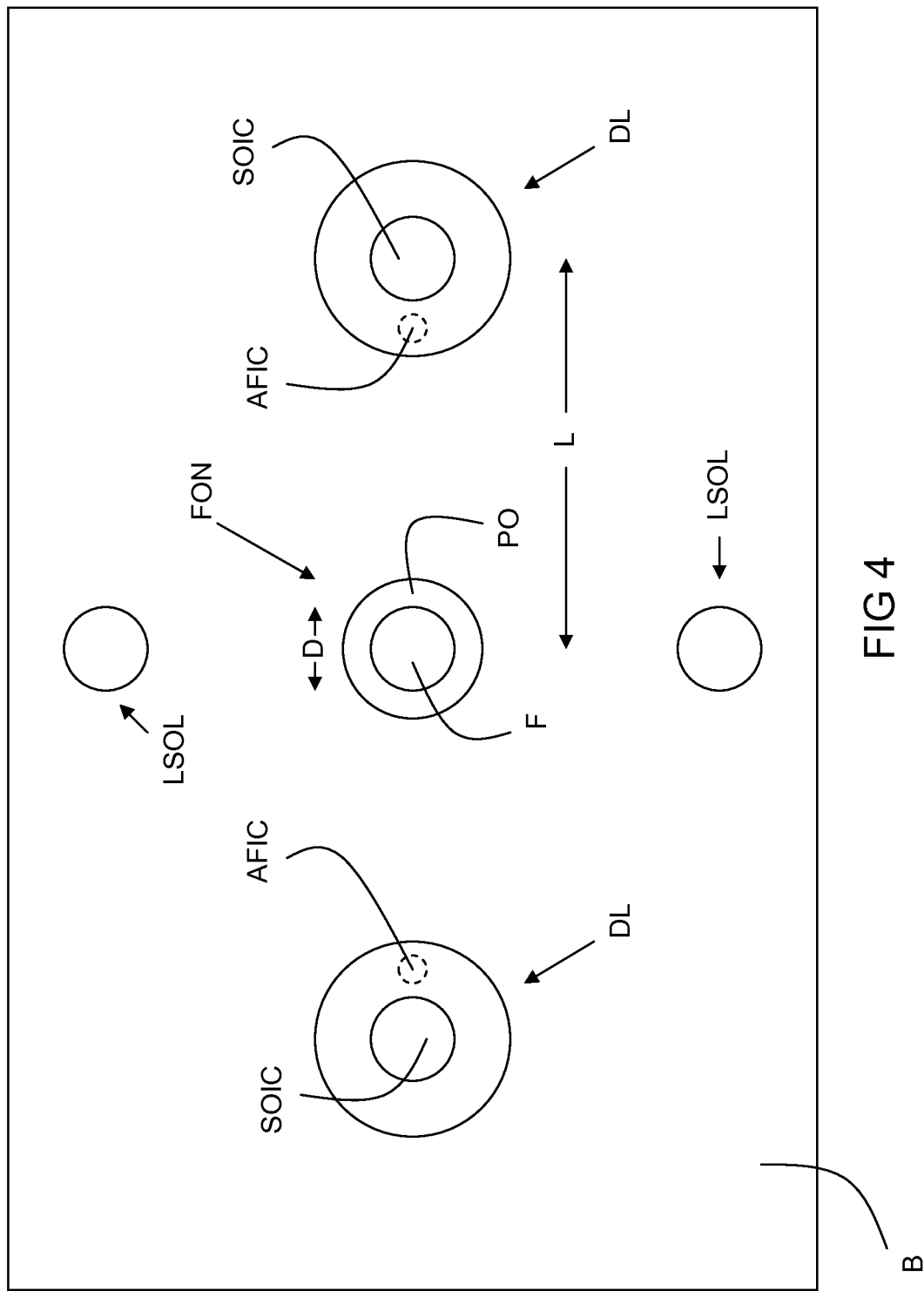
FIG. 4 is a front elevation schematic illustrating hidden parts of a second embodiment of the inventive burner including a pair of low speed oxygen lances disposed above and below the plane in which the primary fuel/oxidant and secondary oxidant nozzles lie.

As best illustrated in FIG. 4, a second embodiment of a burner B is identical to that of the first embodiment of FIG. 3 except that it also includes a pair of low speed oxidant lances LSOL. One of the low speed oxidant lances LSOL is disposed above and one is disposed below the horizontal plane in which the fuel/oxidant nozzle FON and the dynamical lances DL lie.

One type of dynamical lance DL suitable for use in the inventive methods and burners is shown in FIGS. 5A-5E. The dynamical lance DL includes a main nozzle body MB and a cap CP. A centrally disposed reactant injection channel SOIC and an actuating fluid injection channel AFIC extend through the main nozzle body MB. A cap CP covers the end of the main nozzle body MB that faces the combustion space. The secondary oxidant SO flows through and is injected from the secondary oxidant injection channel. During the transition from the first (e.g., heating) phase to the second (e.g., distributed combustion) phase or during the second phase, actuating fluid AF flows through the actuating fluid injection channel AFIC. The actuating fluid injection channel AFIC is illustrated with broken lines in FIGS. 5A-B as it is not visible from the front of the dynamical lance DL.

The terminus (facing the combustion space) of the main nozzle body MB is covered with and joined to a cap CP. The cap CP has a terminal opening TO aligned with the axis of the secondary oxidant injection channel SOIC. The terminal opening TO is generally sized to match a diameter of the secondary oxidant injection channel SOIC so that the flow of secondary oxidant SO out of the secondary oxidant injection channel SOIC continues through the terminal opening TO and out the dynamical lance DL. The cap CP includes a cavity C on the side facing the terminus of the main body MB.

Figure 5E:
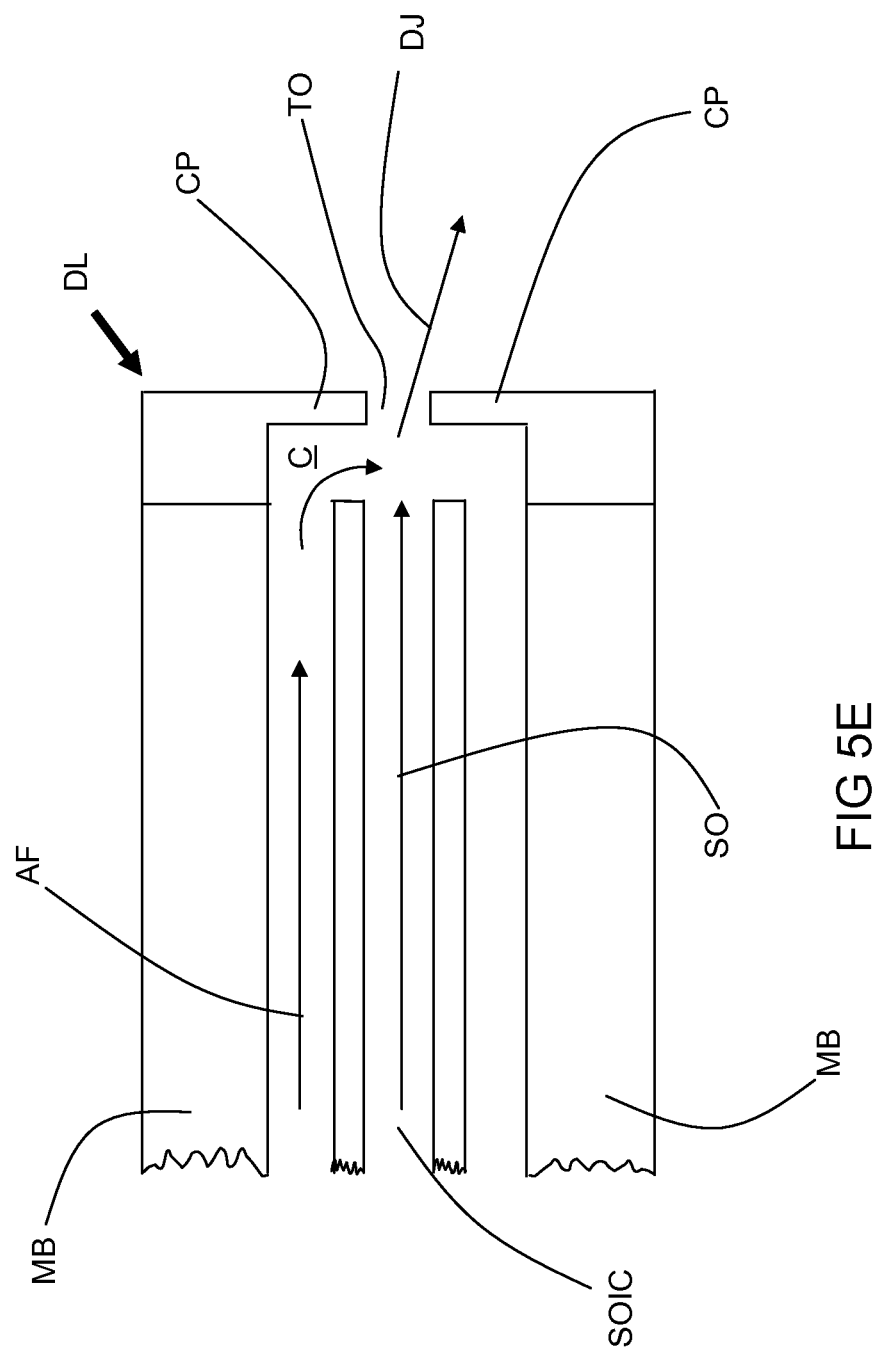
FIG. 5E is a schematic elevation view of a lengthwise slice taken of the dynamical lance of FIG. 5A.

The cavity extends in the axial direction of the cap CP (upstream to downstream) to terminate at a flat surface lying in a plane perpendicular to the axis of the dynamical lance DL. While the outer wall OW in FIGS. 5B, 5C, and 5E illustrate a cavity as having a generally circular shape with a rounded triangular projection, the cavity can have any shape so long as it extends between the terminal opening TO and the actuating fluid injection channels AFIC to provide fluid communication therebetween.

With continuing reference to FIGS. 5A-5E, the secondary oxidant SO flows out the terminal end of the secondary oxidant injection channel SOIC and out the terminal opening TO in the cap CP. As the flow of the actuating fluid AF exits the actuating fluid injection channel AFIC, the flat surface of the cavity redirects the direction of the flow of actuating fluid AF so that it intersects the flow of secondary oxidant SO being injected from the secondary oxidant injection channel SOIC at about a right angle. Because the jet of actuating fluid AF intersects the jet of the secondary oxidant SO from the secondary oxidant injection channel SOIC, the central jet of secondary oxidant SO is caused to be bent/diverted/angled away from its original flow axis and away from the axis of the fuel injection from the fuel/oxidant nozzle. The angle of bending/diversion may be controlled by controlling the pressure of the actuating fluid AF.

Figure 6B:
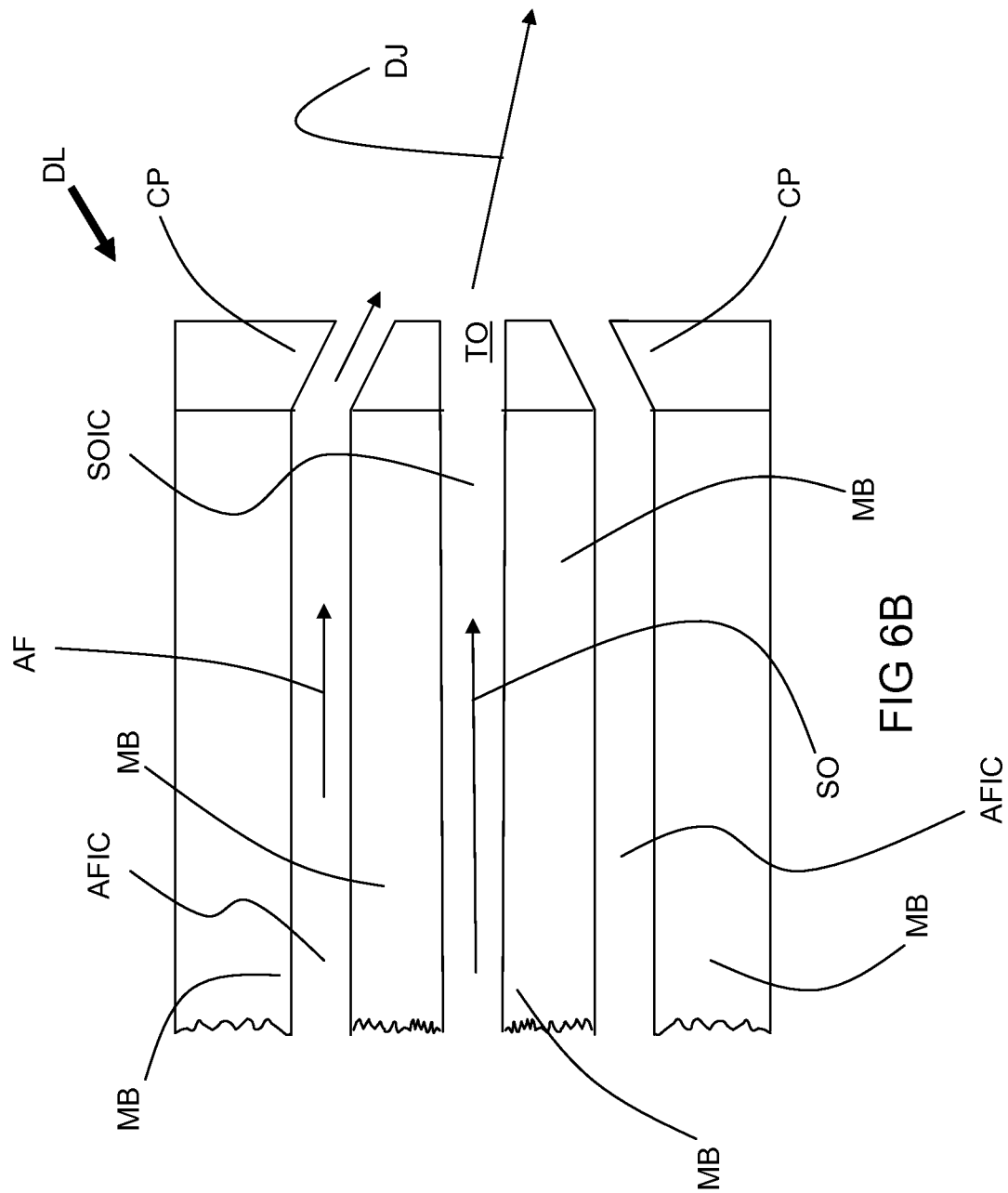
FIG. 6B is a schematic elevation view of a lengthwise slice taken of the dynamical lance of FIG. 6A.

Another type of dynamical lance DL suitable for use in the inventive methods and burners is shown in FIGS. 6A-6B. The dynamical lance DL includes a main nozzle body MB and a cap CP. A secondary oxidant injection channel SOIC and an actuating fluid injection channel AFIC extend through the main nozzle body MB. A cap CP covers the end of the main nozzle body MB that faces the combustion space. Secondary oxidant SO flows through and is injected from secondary oxidant injection channel SOIC. During the transition from the first (e.g., heating) phase to the second (e.g., distributed combustion) phase or during the second phase, actuating fluid AF flows through the actuating fluid injection channel AFIC. The actuating fluid injection channel AFIC is illustrated with broken lines in FIG. 6A as it is not visible from the front of the dynamical lance DL.

The terminus (facing the combustion chamber) of the main nozzle body MB is covered with and joined to a cap CP. The cap CP has a terminal opening TO aligned with the axis of the secondary oxidant injection channel SOIC. The terminal opening TO is generally sized to match a diameter of the secondary oxidant injection channel SOIC so that the flow of secondary oxidant SO out of the secondary oxidant injection channel SOIC continues through the terminal opening TO and out the dynamical lance DL. The cap CP also includes two holes H drilled therethrough each one of which is in fluid communication between an outlet of a respective actuating fluid injection channel AFIC and the terminal face of the cap CP spaced away from the terminal opening TO. The holes H are drilled at an angle towards the axis of the secondary oxidant injection channel SOIC, but the hole H does not intersect the terminal opening TO of the cap CP. Thus, the secondary oxidant SO flows out the terminal end of the secondary oxidant injection channel SOIC in the form of a jet through the terminal opening TO while the actuating fluid AF flows from the outlet of the actuating fluid injection channels AFIC into the holes H and exits out the cap CP in the form of a jet at an angle to the jet of secondary oxidant SO. The jet of actuating fluid AF intersects the jet of secondary oxidant SO after it has exited the dynamical lance DL. Because the jet of actuating fluid AF intersects the jet of the secondary oxidant SO from the secondary oxidant injection channel SOIC, the central jet of secondary oxidant SO is caused to be bent/diverted/angled away from its original flow axis and away from the axis of the fuel injection from the fuel/oxidant nozzle. The angle of bending/diversion may be controlled by controlling the pressure of the actuating fluid AF.

While two embodiments of dynamical lances have been described above, one skilled in the art will recognize that other techniques known in the art suitable for fluidically bending/diverting/angling a jet may be used with equal effect in the inventive method. For example, other suitable techniques include those taught in U.S. Published Patent Application No. US 20100068666 A1, the contents of which are incorporated herein in its entirety.

EXAMPLE

A natural gas fired burner was constructed in conformance with the embodiment of FIG. 4, installed in the bottom of a furnace and operated in accordance with the above-disclosed methods at 20 kW and 25 kW powers. Thermocouples were placed near the furnace wall at positions adjacent the roof (number 8) and floor (number 5). Three additional thermocouples (numbers 2, 3, and 4 in order of higher to lower) were placed at similar positions near the wall at 17.75 cm intervals between the first two thermocouples. Two more thermocouples were placed directly above the burner at vertical positions similar to those of the highest thermocouple placed near the wall (number 1) and the second highest thermocouple placed near the wall (number 9) for a total of seven.

During operation of the burner under distributed combustion conditions, the furnace temperature at each thermocouple location was recorded and is tabulated in Table I. As seen in Table I, relatively good temperature uniformity was observed. Additionally, the burner only produced 30 ppm of NOx level at 20 kW and 36 ppm at 25 kW. The CO level was zero. When the low speed lances were utilized, no flame was observed.

TABLE I

| Furnace Temperature (° C.) at 20 kW and 25 kW for | | | | | | | |
|---|---|---|---|---|---|---|---|
| TC # | 1 | 2 | 3 | 4 | 5 | 8 | 9 |
| 25 kW | 1191 | 1126 | 1128 | 1005 | 826 | 1113 | 1274 |
| 20 kW | 1097 | 1023 | 1038 | 917 | 732 | 985 | 1191 |

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method of performing distributed combustion, comprising the steps of:
    injecting fuel into a furnace along a fuel injection axis from a fuel nozzle disposed in a burner block, an axis of the fuel nozzle being a fuel injection nozzle;
    injecting primary oxidant into the furnace from a primary oxidant nozzle, the fuel and primary oxidant nozzles being concentrically disposed with respect to one another;
    combusting the fuel and primary oxidant in the furnace;
    injecting first and second jets of secondary oxidant into the furnace from first and second dynamical lances disposed on opposite sides of the fuel nozzle in the burner block;
    decreasing an amount of the primary oxidant injected from the primary oxidant nozzle as an amount of the secondary oxidant injected as the first and second jets of secondary oxidant is increased; and
    injecting first and second jets of actuating fluid at angles to the first and second jets of secondary oxidant, respectively, such that the first and second jets of secondary oxidant are fluidically angled away from the fuel injection axis.

2. The method of claim 1, wherein the fuel is gaseous.

3. The method of claim 1, wherein the fuel is atomized liquid.

4. The method of claim 1, wherein the fuel is pulverized solids.

5. The method of claim 4, wherein the fuel is pulverized coal.

6. The method of claim 5, wherein the pulverized coal is fluidized and injected with a conveying gas of air or recycled flue gas.

7. The method of claim 1, further comprising the steps of:
    increasing amounts of the fuel and primary oxidant injected into the furnace; and
    decreasing an amount of the actuating fluid injected as first and second actuating fluid jets thereby decreasing the degree to which the first and second jets of secondary oxidant are fluidically angled away from the fuel injection axis.

8. The method of claim 1, further comprising the step of injecting an additional portion of secondary oxidant from first and second low speed oxidant lances disposed above and below the fuel nozzle, respectively, wherein:
    the additional portion of secondary oxidant is injected at a velocity less than that from the first and second dynamical lances.

9. The method of claim 1, wherein combustion of the fuel and oxidant produces no visible flame.

10. The method of claim 1, wherein the fuel and the first and second jets of secondary oxidant are injected parallel to one another before injection of the actuating fluid is initiated.

* * * * *